United States Patent [19]

Sugiyama

[11] Patent Number: 4,654,621

[45] Date of Patent: Mar. 31, 1987

[54] SEMICONDUCTOR STRAIN MEASURING APPARATUS

[75] Inventor: Susumu Sugiyama, Nagoya, Japan

[73] Assignee: Kabushiki Kaisha Toyota Chuo Kenkyusho, Aichi, Japan

[21] Appl. No.: 738,092

[22] Filed: May 24, 1985

[30] Foreign Application Priority Data

May 29, 1984 [JP] Japan .................................. 59-108937

[51] Int. Cl.$^4$ ................................................. G01L 1/22
[52] U.S. Cl. ............................................. 338/5; 338/2
[58] Field of Search ........................................ 338/2–5; 73/726, 727; 29/25.35, 569 R, 590, 610 SG

[56] References Cited

U.S. PATENT DOCUMENTS

| | | | |
|---|---|---|---|
| 4,080,830 | 3/1978 | Eckstein et al. | 338/4 X |
| 4,463,336 | 7/1984 | Black et al. | 338/4 |
| 4,510,671 | 4/1985 | Kurtz et al. | 338/4 X |

Primary Examiner—E. A. Goldberg
Assistant Examiner—M. M. Lateef
Attorney, Agent, or Firm—Koda and Androlia

[57] ABSTRACT

Semiconductor strain measuring apparatus for producing electrical output signals indicative of physical strains, in which a single crystal silicon substrate has the impurity concentration within the range between $1 \times 10^{16} cm^{-3}$ and $2 \times 10^{19} cm^{-3}$, thereby inhibiting the increase in the reverse leakage current flowing from the strain gauge through the substrate at high temperatures and thus enabling exact measurements even at high temperatures above 180° C.

13 Claims, 9 Drawing Figures

F I G . 6
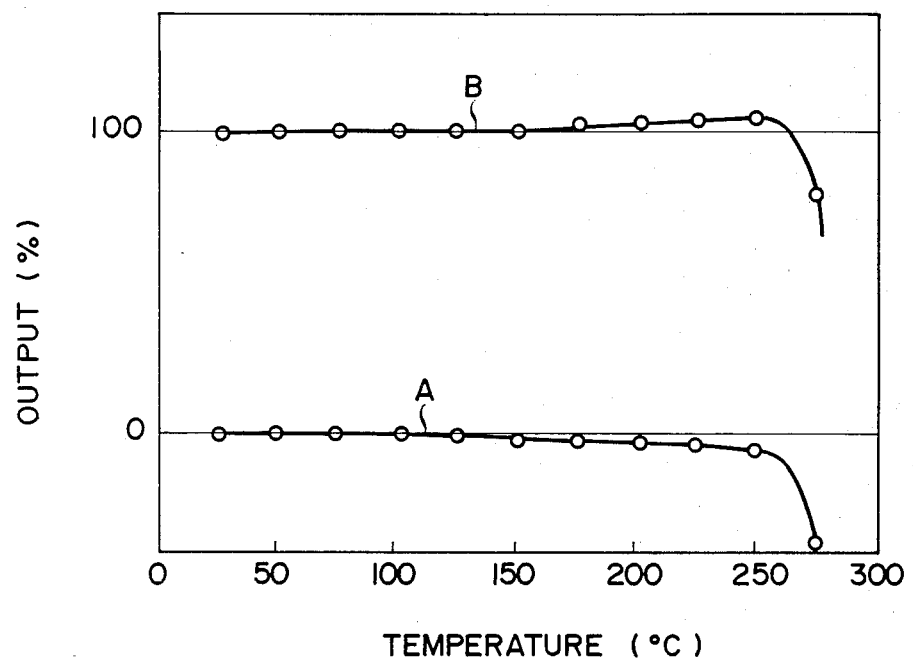

SEMICONDUCTOR STRAIN MEASURING APPARATUS

BACKGROUND OF THE INVENTION

1. Field of the Invention

The present invention relates to an improvement in a semiconductor strain measuring apparatus which is particularly adapted to produce electric output signals indicative of physical strains.

2. Description of the Prior Art

Semiconductor strain measuring instruments which comprise a single crystal silicon substrate including a strain sensitive region formed thereon and strain gauges formed integrally on the surface of the strain sensitive region are well known. Such a semiconductor strain measuring instrument is currently utilized in various applications because it can electrically detect any physical strain created in the strain sensitive region of the substrate through the strain gauges.

A strain measuring instrument including diffusion strain gauges is currently used in various fields such as automobile measurements, industrial measurements and medical measurements. The strain measuring instrument utilizing such diffusion strain gauges can easily be miniaturized using IC techniques and be superior in the mechanical characteristics. Accordingly, a strain measuring instrument of this type is being used to measure pressure at minute locations.

Thus, semiconductor strain measuring instruments are today utilized in various applications and will increasingly be applied to a wide range of applications. The semiconductor strain measuring instruments are particularly important in the automobile industry wherein precise measurement of pressure is required at various locations in an engine to control the engine with high precision and then to utilize fuel more efficiently. It is therefore expected to provide semiconductor strain measuring instruments which can determine pressures at locations in an engine.

However, the semiconductor strain measuring instruments of the prior art are subject to rapid degradation at high-temperatures and will be inoperative at temperatures above 180° C.

It is therefore impossible to use the conventional semiconductor strain measuring instruments for measuring pressure at various parts in an engine which may be heated to raised temperatures, sometimes above 250° C.

SUMMARY OF THE INVENTION

In view of the above problem of the prior art, it is an object of the present invention to provide a semiconductor strain measuring apparatus which can exactly measure various kinds of strains or pressures even under high-temperature circumstances above 180° C.

In accordance with the present invention, the above object is accomplished by providing a semiconductor strain apparatus which comprises a single crystal silicon substrate including a strain sensitive region formed thereon and at least one strain gauge located integrally on the strain sensitive region of the substrate. The apparatus is further characterized in that one of the single crystal silicon substrate and strain gauge is formed into P-type with the other being formed into N-type and in that the impurity concentration of the single crystal silicon substrate is in the range between $1 \times 10^{16}$ and $2 \times 10^{19}$ cm$^{-3}$.

The present invention is also characterized by an intermediate layer located between the strain sensitive region and the strain gauge, in that either the intermediate layer or the strain gauge is formed into P-type with the other being formed into N-type and in that the impurity concentration in the intermediate layer is in the range between $1 \times 10^{16}$ and $2 \times 10^{19}$ cm$^{-3}$.

BRIEF DESCRIPTION OF THE DRAWINGS

FIG. 6 is a graph illustrating the temperature relationship in the apparatus according to the present invention;

DESCRIPTION OF PREFERRED EMBODIMENTS

First Embodiment

Figure 1:
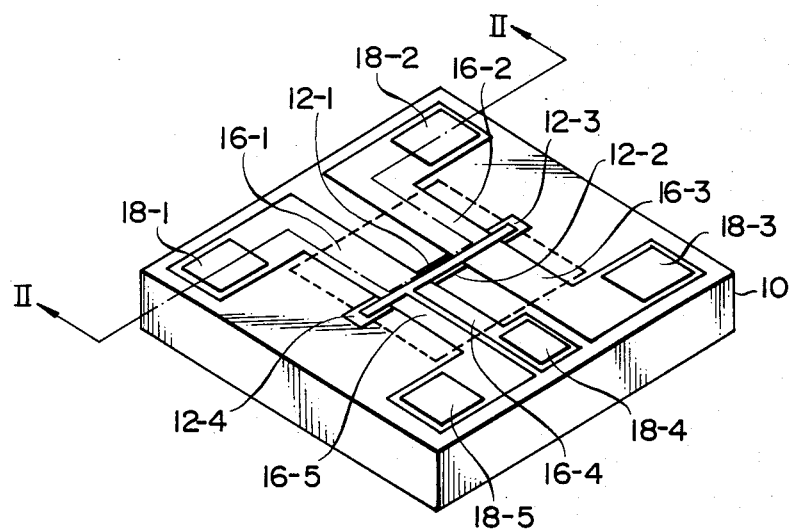
FIG. 1 is a perspective top view of a semiconductor strain measuring apparatus which is the first preferred embodiment of the present invention.
Figure 2:
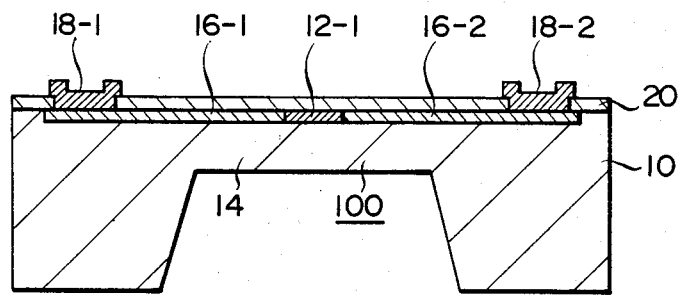
FIG. 2 is a cross-sectional view of the measuring apparatus taken along a line II—II in FIG. 1.

Referring to FIGS. 1 and 2, there is shown a semiconductor strain measuring instrument according to the present invention which comprises a single crystal silicon substrate 10 having a strain sensitive region 100 and at least one diffusion strain gauge 12 formed integrally on the strain sensitive region 100. The silicon strain gauge 12 is adapted to produce electrical output signals indicative of physical strains created in the strain sensitive region.

The substrate 10 has top and bottom surfaces of square configuration, the bottom surface being etched at the central area to form a diaphragm 14 which serves as the strain sensitive region 100.

The top face of the strain sensitive region 100 (i.e. the diaphragm 14) includes four diffusion strain gauges 12-1, 12-2, 12-3 and 12-4 all of which are formed integrally thereon. Each of the strain gauges 12 is adapted to change its resistance in proportion to the level of pressure which is applied to the diaphragm 14. In the illustrated embodiment, each of the strain gauges 12 is set to have a resistance of 1 kilo-ohms in its non-strained state.

The top face of the substrate 10 also includes diffusion lead layers 16-1, 16-2, . . . 16-5 formed thereon and each having one end connected with the corresponding strain gauge 12. The other end of each of the lead layers 16 includes a metallic electrode 18-1, 18-2, 18-3, 18-4 or 18-5 formed thereon by aluminium deposition. This metallic electrode 18 co-operates with the corresponding strain gauge 12 to form a bridge circuit. All of the strain gauges 12 and lead layers 16 on the substrate 10 are protectively coated with a silicon oxide film 20.

When such a strain measuring instrument is used for pressure, the four metallic electrodes 18 are connected to form a bridge circuit to which an external voltage is applied. The bridge circuit will generate an electric output signal indicative of a pressure which is applied to the diaphragm 14.

The electric output signals from the semiconductor strain measuring instrument may include a leakage current from the respective strain gauge 12 to the substrate 10 as an error component. In such a semiconductor strain measuring instrument, generally, either the substrate 10 or the strain gauge 12 is formed into P-type with the other being formed into N-type. Both the substrate and strain gauge are connected as a PN junction so that the creation of the leakage current will be inhibited.

In the illustrated embodiment, the substrate 10 is formed into N-type while the diffusion strain gauges 12 and diffusion lead layers 16 are respectively formed into P-type.

Figure 3:
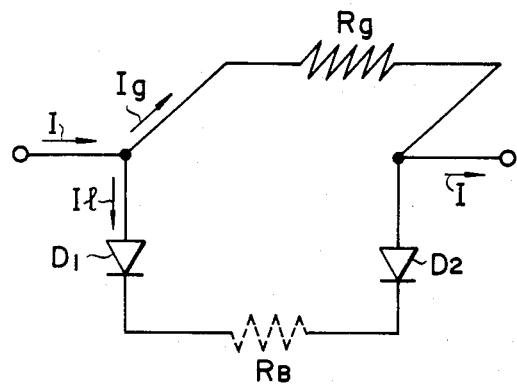
FIG. 3 illustrates an equivalent circuit used in the first embodiment shown in FIGS. 1 and 2.

FIG. 3 shows an equivalent circuit used in the strain measuring instrument according to the present invention. In FIG. 3, $R_g$ denotes a resistance in a strain gauge 12 and $R_B$ designates a resistance in the substrate 10. $D_1$ and $D_2$ equivalently represent, ad diodes, a junction surface between the strain gauge 12 formed into P-type and the substrate 10 formed into N-type. Actually, the PN junction between the strain gauge 12 and the substrate 10 is distributed through the entire diffusion area of the strain gauge. For easy consideration, however, FIG. 3 approximately illustrates the PN junction by the use of two diodes $D_1$ and $D_2$ which are disposed in the directions of inflow and outflow currents, respectively.

It is apparently appreciated from FIG. 3 that a leakage current Il from the strain gauge 12 to the substrate 10 will be precluded by either of the diode $D_1$ or $D_2$. Thus, the percentage of the leakage current Il included in the inflow current I toward the strain gauge 12 can highly be reduced.

The conventional semiconductor strain measuring instruments included a substrate 10 of N-type having its impurity concentration of $3 \times 10^{15}$ cm$^{-3}$ and diffusion strain gauges 12 and diffusion lead layers 16 each of which is a P-type diffusion layer with its surface impurity concentration of about $3 \times 10^{20}$ cm$^{-3}$.

Figure 4:
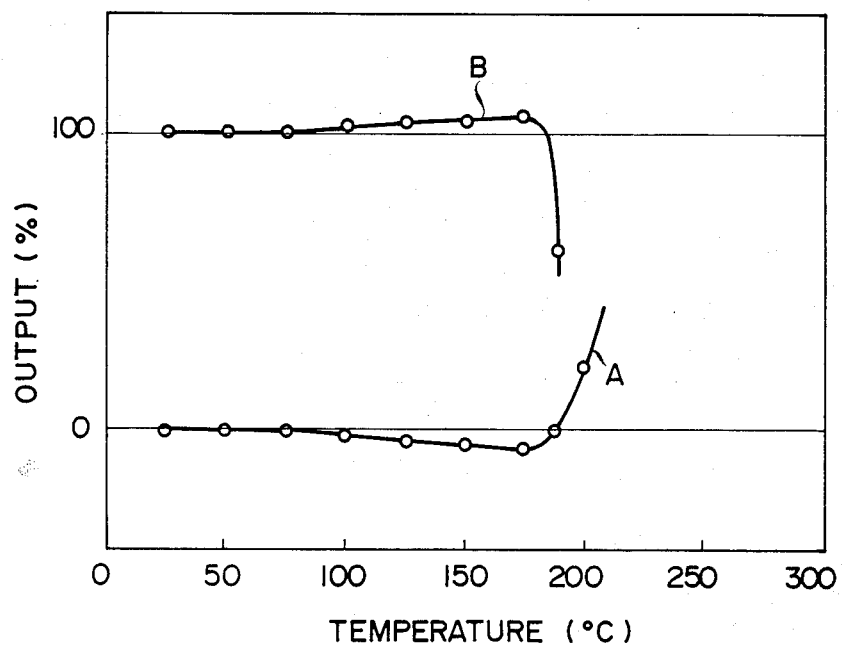
FIG. 4 is a graph illustrating the temperature characteristics of a prior art semiconductor strain measuring instrument.

FIG. 4 shows the temperature characteristics of one of the conventional strain measuring instruments so constructed. In this graph, a curve B represents the bridge output of each of the strain gauges 12 when a full-scale pressure is applied thereto, that is, the temperature characteristics of the strain measuring instrument relative to the full-scale output. A curve A represents the temperature characteristics at the zero point, that is, the drift of the bridge output when no pressure is applied to the strain gauge.

As seen from FIG. 4, the absolute value of the drift at the zero point shown by the curve A is negligible at about room temperature, compared with the bridge outputs shown by the curve B. As the temperature increases, the absolute value of the drift is increased. The ambient temperature above 180° C. causes a sharp increase of the drift. As a result, both the curves A and B will have the change of several tens %/FS so that no exact measurement of pressure can be made by the conventional strain measuring instruments.

The following three factors providing the limits of the operating temperature in the strain measuring instruments can be considered:

First, limits of temperature in the resistance of the strain gauges 12 themselves.

Second, limits of temperature relating to the increase of the reverse leakage current Il at the PN junction used for the insulative separation between the strain gauges 12 and between the strain gauges 12 and the substrate 10.

Finally, limits of temperature based on the construction and material of the measuring instrument itself.

Upon experimentally studying these factors, it has been found that the second factor is the most important relative to the limits of operating temperature in the strain measuring instrument.

As seen from FIG. 3, the supply current I from a source to the strain gauges 12 is divided into an effective current Ig passing through the strain gauges and a leakage current Il from the strain gauges 12 to the substrate 10. The value of the leakage current Il is determined by the value of the reverse leakage current in the reverse diode $D_2$ which is formed between the gauges 12 and the substrate 10. This reverse leakage current is equal to about several tens nA at room temperature. Even in the conventional strain measuring instruments, therefore, exact measurement of strain can be made at room temperature.

However, the reverse leakage current Il is exponentially increased with increase in the temperature. It reaches several tens nA at 200° C. If the supply current I is maintained constant, the effective current Ig flowing into the strain gauges 12 is decreased so that a reduction in the output sensitivity will apparently be observed.

When this phenomenon is studied based on the temperature characteristics of the prior art strain measuring instrument shown in FIG. 4, the reverse leakage current, that is, the exponential increase of the leakage current Il can be proven from the fact that as shown by the curve B, the output of the strain measuring instrument is sharply reduced when the temperature exceeds 180° C.

Such an increase of the leakage current Il in each of the strain gauges 12 breaks the balance in the resistance in the bridge circuit defined by the strain gauge 12. This leads to the increased change of drift at the zero point in the bridge circuit. As shown by the curve A, a sharp breakage of the balance in the resistance is created to disable any measurement as the temperature exceeds 180° C.

The present invention is characterized in that the increase of the reverse leakage current Il passing through the PN junction between the strain gauge 12 and the substrate 10 associated with the increase of temperature can sufficiently be inhibited in the range of higher temperatures, whereby exact measurements of various types can be carried out even under operating conditions wherein the temperature exceeds 180° C.

For this purpose, the present invention requires that the impurity concentration of the substrate 10 be set in the range of $1 \times 10^{16}$ cm$^{-3}$ to $2 \times 10^{19}$ cm$^{-3}$.

In the strain measuring instrument so constructed according to the present invention, the reverse leakage current Il passing through the PN junction between the strain gauge 12 and the substrate 10 can be reduced to several fractions of that of the prior art instruments. Even if the ambient temperature exceeds 180° C., the increase in the reverse leakage current Il can sufficiently be inhibited. As a result, the strain measuring instrument according to the present invention can perform exact measurements of strain even under temperature conditions above 180° C.

In the illustrated embodiment, the impurity concentration in the substrate 10 is established to be equal to $1 \times 10^{17}$ cm$^{-3}$.

To further reduce the variations in sensitivity due to the temperature characteristics when a source of constant current is applied to the strain gauge 12, it is preferred that the surface impurity concentration of a diffusion strain gauge 12 be selected to be in the range between $2.4 \times 10^{20}$ cm$^{-3}$ and $4 \times 10^{20}$ cm$^{-3}$. In the illustrated embodiment, the surface impurity concentration of the strain gauge 12 is selected to be equal to $3 \times 10^{20}$ cm$^{-3}$.

Figure 5:
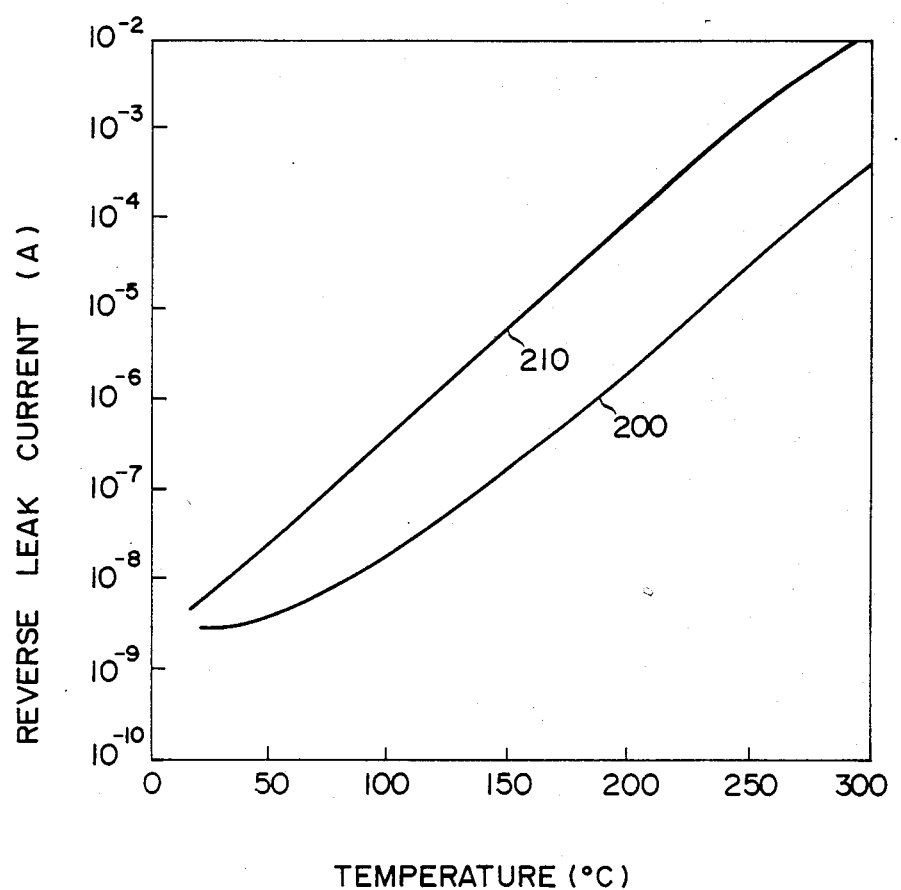
FIG. 5 is a graph showing characteristic curves of the measuring instruments of the prior art and the present invention in comparison.

FIG. 5 shows the temperature characteristics of the reverse leakage current Il in the PM junction between the diffusion strain gauge 12 and the substrate 10. In this graph, 200 denotes the characteristic curve of the first embodiment while 210 designates that of the prior art instrument.

As is apparent from FIG. 5, the reverse leakage current Il in the present invention is reduced by one figure or more at the respective temperatures compared with the prior art. Even when the temperature increases above 200° C., the value of the reverse leakage current can be maintained in the order of microamperes.

FIG. 6 shows the temperature characteristics of the semiconductor strain measuring instrument according to the present invention. In this graph, a curve A illustrates the temperature characteristics at the zero point while a curve B represents the temperature characteristics of the output. As can be understood when the temperature characteristics shown in FIG. 6 are compared with the temperature characteristics of the prior art shown in FIG. 4, the instrument of the present invention has characteristics which are maintained steady at the ambient temperature to above 200° C. and possible above 250° C.

Figure 7:
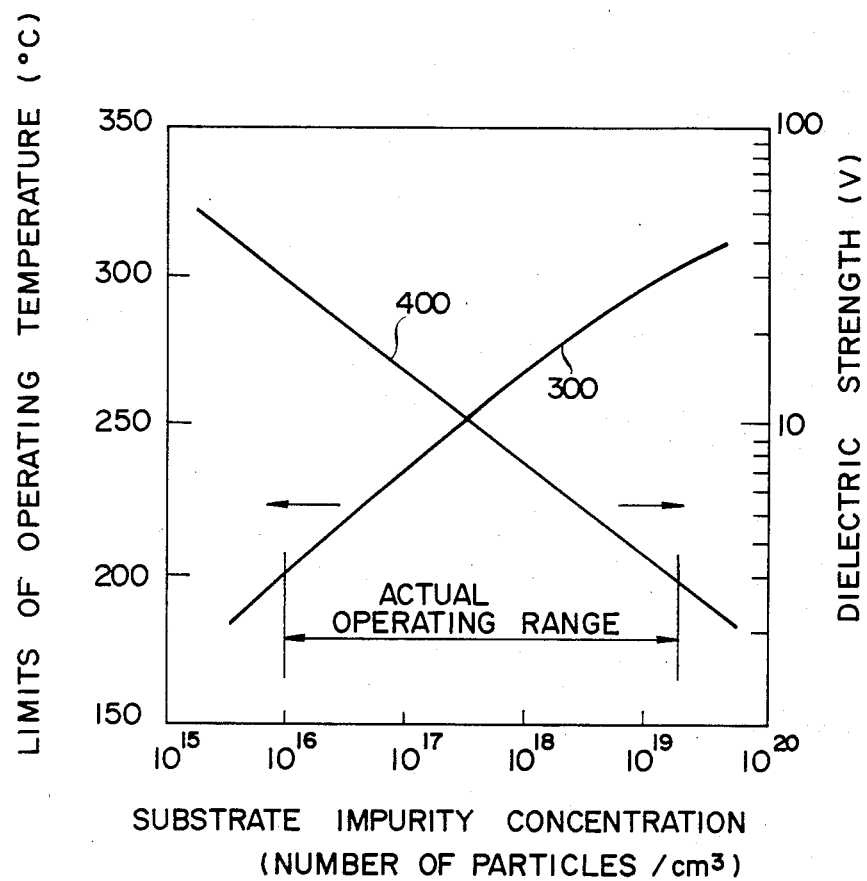
FIG. 7 is a graph illustrating the interrelationship between impurity concentration, and limits of operating temperature or dielectric strength.

FIG. 7 shows experimental data obtained from the strain measuring instrument of the present invention when the impurity concentration in the single crystal silicon substrate 10 is being increased. In this graph, a characteristic curve 300 shows the limits of operating temperature in the instrument while a characteristic curve 400 represents dielectric strengths in the instrument at the PN junction between the strain gauge 12 and the substrate 10.

The limits of operating temperature represented by the characteristic curve 300 is defined to be a temperature when a ratio of the reverse leakage current Il to the supply current I, that is, Il/I exceeds one percent. This is because when the ratio Il/I reaches one percent, the variations in sensitivity relative to the output will exceed one percent so that precise measurements of pressure will no longer be expected at temperatures exceeding the above defined value.

As seen from the characteristic curve 300 in FIG. 7, the limit of operating temperature in the instrument is increased as the impurity concentration in the substrate 10 is increased, so that measurement can be made at higher temperatures.

As seen from the characteristic curve 400 in FIG. 7, however, the dielectric strength at the PN junction between the strain gauge 12 and the substrate 10 is conversely linearly reduced as the impurity concentration in the substrate 10 is increased. As a result, dielectric breakdown can easily be created at the PN junction. If a supply voltage used exceeds the dielectric breakdown voltage shown by the characteristic curve 400, therefore, a dielectric breakdown occurs at the PN junction between the strain gauge 12 and the substrate 10 so that the instrument will be damaged.

In general, the supply voltage used in such strain measuring instruments is equal to 3 volts or higher. Thus, the actual impurity concentration in the substrate 10 has a value corresponding to the dielectric strength of 3 volts, that is, an upper limit of $2 \times 10^{19}$ cm$^{-3}$.

To make exact measurements without damage in the dielectric strength even under circumstances at which the ambient temperature ranges above 200° C., it is required that the impurity concentration in the substrate 10 be selected to be in the range between $1 \times 10^{16}$ cm$^{-3}$ and $2 \times 10^{19}$ cm$^{-3}$. For example, when the impurity concentration in the substrate 10 has the upper limit of $2 \times 10^{19}$ cm$^{-3}$, measurement of strain can be carried out upto a temperature of about 300° C. If an impurity concentration is equal in the order of $1 \times 10^{17}$ cm$^{-3}$ as in the illustrated embodiment of the present invention, measurement can be made upto a temperature of about 250° C.

Although the present invention has been described with reference to the embodiment wherein the strain gauges 12 are formed into P-type while the substrate 10 is formed into N-type, the present invention is not limited to this embodiment and can be applied to such an embodiment that the strain gauges 12 are formed into N-type while the substrate 10 is formed into P-type. Such an embodiment also can provide good temperature characteristics.

Second Embodiment

Figure 8:
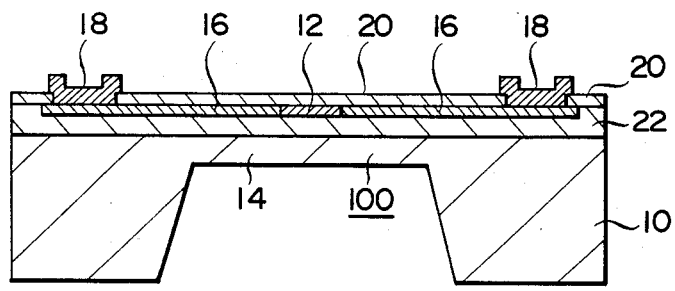
FIG. 8 illustrates the second preferred embodiment of the present invention.

FIG. 8 shows the second embodiment of the present invention wherein similar parts are designated by similar reference numerals and further description will be omitted.

The second embodiment is characterized by an intermediate single crystal layer 22 on the strain sensitive region of the substrate 10 between the surface of the diaphragm 14 and the strain gauges 12. Either intermediate single crystal layer 22 or the strain gauge 12 is formed into P-type while the other member is formed into N-type. In addition, the impurity concentration in the intermediate single crystal layer 22 is selected to be in the range between $1 \times 10^{16}$ cm$^{-3}$ and $2 \times 10^{19}$ cm$^{-3}$.

In the second embodiment, the intermediate single crystal layer 22 is laminated on the top face of the substrate 10 throughout the entire area by the use of epitaxial growth process. This intermediate layer 22 is formed into N-type which has an impurity concentration of $1 \times 10^{17}$ cm$^{-3}$.

In the second embodiment, the single crystal silicon substrate 10 is formed into P-type wherein its impurity concentration is equal to $1 \times 10^{15}$ cm$^{-3}$, while each of the strain gauges 12 is formed into P-type in which the impurity concentration is equal to $3 \times 10^{20}$ cm$^{-3}$.

By providing the intermediate layer 22 having a predetermined concentration of impurity, any reverse leakage current Il passing through the substrate 10 from the strain gauges 12 can efficiently be inhibited to provide good temperature characteristics substantially similar to those of the first embodiment. Thus, exact measurements of strain can be carried out even under conditions of operation wherein the temperature exceeds 180° C.

Third Embodiment

Figure 9:
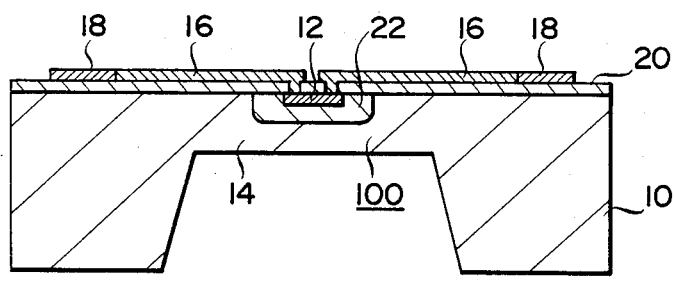
FIG. 9 illustrates the third preferred embodiment of the present invention.

FIG. 9 shows the third embodiment of the present invention wherein an intermediate diffusion layer 22 is formed on the top face of the diaphragm 14 of the single crystal silicon substrate 10 which is formed by etching. Diffusion strain gauges 12 are formed within the intermediate diffusion layer 22.

The top face of the substrate 10 is coated with a silicon oxide film 20 on which lead layers 16 from the respective diffusion strain gauges 12 and electrodes 18 are formed.

In the third embodiment, the intermediate diffusion layer 22 is formed into N-type with its surface impurity concentration of $1 \times 10^{17}$ cm$^{-3}$. Each of the diffusion strain gauges 12 is formed into P-type having a surface impurity concentration of $3 \times 10^{20}$ cm$^{-3}$. The substrate 10 is formed into N-type which has an impurity concentration of $1 \times 10^{15}$ cm$^{-3}$.

The third embodiment can efficiently inhibit the leakage current Il passing from the strain gauge 12 through the substrate 10 as in the second embodiment and provide good temperature characteristics as in the first embodiment.

Since the strain measuring instruments of the second and third embodiments each include the intermediate layer 22 to provide the PN junction between the intermediate layer 22 and the strain gauges 12 which efficiently inhibit the reverse leak current, the characteristics of the substrate 10 will not be changed even if it is formed into either of P-type or N-type, and yet the impurity concentration of the substrate 10 can be selected to any value within such a range that the crystalline property of the substrate will not be damaged. Therefore, the strain measuring instruments according to the second and third embodiment can have extremely moderate requirements for the substrate 10 compared with the first embodiment.

Although the second and third embodiments have been described to have the intermediate layer 22 of N-type and the strain gauges 12 of P-type, the present invention is not limited to such a form and may include an intermediate layer 22 of P-type and strain gauges 12 of N-type.

Although the second and third embodiments also have been described as to the intermediate layer 22 having an impurity concentration of $1 \times 10^{17}$ cm$^{-3}$, the present invention is not limited to this impurity concentration and may provide the intermediate layer having an impurity concentration ranging between $1 \times 10^{16}$ cm$^{-3}$ and $2 \times 10^{19}$ cm$^{-3}$.

In all the aforementioned embodiments of the present invention, the diffusion strain gauges may be formed also by ion injection in place of thermal diffusion to provide good characteristics entirely similar to that of thermal diffusion.

The semiconductor strain measuring instruments according to the present invention may be used to measure pressure at various locations in the automobile engine and also currently be utilized in the other applications such as weighing meters, acceleration meters, torque meters and the like.

It will be apparent from the foregoing that the present invention can efficiently inhibit the increase of the reverse leak current passing from the strain gauges through the substrate at high-temperature range so that exact measurements will be carried out even under high-temperature conditions above 180° C.

What is claimed is:

1. A semiconductor strain measuring apparatus comprising a single crystal silicon substratre including a strain sensitive region formed thereon, and at least one strain gauge formed integrally on said strain sensitive region, said strain gauge being adapted to produce an electrical output signal indicative of a physical strain created in said strain sensitive region, one of said substrate and strain gauge being formed into P-type with the other being formed into N-type, said substrate having its impurity concentration ranging between $1 \times 10^{16}$ cm$^{-3}$ and $2 \times 10^{19}$ cm$^{-3}$ to electrically isolate said strain gauge from said substrate by a PN junction even at high temperatures.

2. A semiconductor strain measuring apparatus according to claim 1, wherein said substrate is formed into N-type and said strain gauge is formed into P-type.

3. A semiconductor strain measuring apparatus according to claim 2, wherein the surface impurity concentration of said strain gauge is in the range between $2.4 \times 10^{20}$ cm$^{-3}$ and $4 \times 10^{20}$ cm$^{-3}$.

4. A semiconductor strain measuring apparatus comprising: a single crystal silicon substrate including a strain sensitive region formed thereon; at least one strain gauge formed integrally on said strain sensitive region, said strain gauge being adapted to produce an electrical output signal indicative of a physical strain created in said strain sensitive region; and an intermediate layer interposed between said strain sensitive region and said strain gauge, one of said intermediate layer and said strain gauge being formed into P-type with the other being formed into N-type, and the impurity concentration of said intermediate layer being in the range between $1 \times 10^{16}$ cm$^{-3}$ and $2 \times 10^{19}$ cm$^{-3}$.

5. A semiconductor strain measuring apparatus according to claim 4, wherein said strain gauge is formed into P-type and said intermediate layer is formed into N-type.

6. A semiconductor strain measuring apparatus according to claim 5, wherein said substrate is formed into one of P-type and N-type.

7. A semiconductor strain measuring apparatus according to claim 6, wherein the surface impurity concentration of said strain gauge is in the range between $2.4 \times 10^{20}$cm$^{-3}$ and $4 \times 10^{20}$cm$^{-3}$.

8. A semiconductor strain measuring apparatus according to claim 7, wherein the impurity concentration of said silicon substrate is selected within the range between $1 \times 10^{16}$ cm$^{-3}$ and $2 \times 10^{19}$ cm$^{-3}$.

9. A semiconductor strain measuring apparatus according to claim 3, wherein the impurity concentration of said substrate is $1 \times 10^{17}$ cm$^{-3}$, while the surface impurity concentration of said strain gauge is $3 \times 10^{20}$ cm$^{-3}$.

10. A semiconductor strain measuring apparatus according to claim 8, wherein
said substrate is formed into P-type and the impurity concentration thereof is $1 \times 10^{15}$ cm$^{-3}$,
said intermediate layer of N-type is formed on the entire top face of said substrate and the surface impurity concentration thereof is $1 \times 10^{17}$ cm$^{-3}$, and
the surface impurity concentration of said strain gauge of P-type is $3 \times 10^{20}$ cm$^{-3}$.

11. A semiconductor strain measuring apparatus according to claim 8, wherein
said substrate is formed into N-type and the impurity concentration thereof is $1 \times 10^{15}$ cm$^{-3}$, said intermediate layer of N-type is formed on the top face of the strain sensitive region of said substrate and the surface impurity concentration thereof is $1\times10^{17}$ cm$^{-3}$, and the surface impurity concentration of said strain gauge of P-type is $3\times10^{20}$ cm$^{-3}$.

12. A semiconductor strain measuring apparatus according to claim 3, further comprising a protective layer formed on said strain gauge.

13. A semiconductor strain measuring apparatus according to claim 8, further comprising a protective layer formed on said strain gauge.

* * * * *